(12) United States Patent
Bone et al.

(10) Patent No.: US 9,792,683 B2
(45) Date of Patent: Oct. 17, 2017

(54) SYSTEM, VEHICLE AND METHOD FOR ONLINE CALIBRATION OF A CAMERA ON A VEHICLE

(71) Applicant: Application Solutions (Electronics and Vision) Ltd., Lewes (GB)

(72) Inventors: Peter Bone, Lewes (GB); Pantelis Ermilios, Wensin (DE); Peter Gagnon, Brighton (GB); Dave Wibberley, Brighton (GB)

(73) Assignee: Application Solutions (Electronics and Vision) Ltd., Lewes (GB)

( * ) Notice: Subject to any disclaimer, the term of this patent is extended or adjusted under 35 U.S.C. 154(b) by 287 days.

(21) Appl. No.: 14/503,580

(22) Filed: Oct. 1, 2014

(65) Prior Publication Data

US 2015/0092058 A1 Apr. 2, 2015

(30) Foreign Application Priority Data

Oct. 1, 2013 (EP) .................................... 13186955

(51) Int. Cl.
*G06T 7/00* (2017.01)
*B60R 1/00* (2006.01)
(Continued)

(52) U.S. Cl.
CPC .............. *G06T 7/0018* (2013.01); *B60R 1/00* (2013.01); *G06T 7/80* (2017.01); *H04N 17/002* (2013.01); *B60R 2300/00* (2013.01)

(58) Field of Classification Search
CPC ..... G06T 7/0018; B60R 1/00; B60R 2300/00; H04N 17/002
See application file for complete search history.

(56) References Cited

U.S. PATENT DOCUMENTS

| 6,690,840 | B1* | 2/2004 | Janko | G06T 3/00 382/294 |
| 2006/0287826 | A1* | 12/2006 | Shimizu | B60K 35/00 701/431 |

(Continued)

FOREIGN PATENT DOCUMENTS

| DE | 102007043905 | 5/2008 |
| DE | 102009057996 | 5/2011 |

(Continued)

OTHER PUBLICATIONS

European Examiner Maurizio Casteller, European Search Report and Examination Report for European Application No. EP 13 18 6955, mailed Mar. 20, 2014, 8 pages, Munich, Germany.

*Primary Examiner* — Shawn An
(74) *Attorney, Agent, or Firm* — W. F. Fasse (57) ABSTRACT

A camera mounted on or for a vehicle has camera rotational parameters $\phi$, $\theta$, $\psi$ and camera translational parameters $x_c$, $y_c$, $z_c$ in a camera image coordinate system, and the vehicle has a vehicle coordinate system. A method for online or on-the-fly calibration of the camera involves two independent steps, namely while the vehicle is moving relative to the ground, calibrating the camera rotational parameters using a parallel geometrical calibration process, and calibrating at least some of the camera translational parameters $x_c$, $y_c$ independently of the camera rotational parameters.

14 Claims, 5 Drawing Sheets

(51) Int. Cl.
*H04N 17/00* (2006.01)
*G06T 7/80* (2017.01)

(56) References Cited

U.S. PATENT DOCUMENTS

| | | | | |
|---|---|---|---|---|
| 2010/0245576 | A1* | 9/2010 | Inui | G06T 7/0018 348/148 |
| 2011/0115922 | A1* | 5/2011 | Shimizu | G06T 7/0018 348/188 |
| 2013/0120578 | A1* | 5/2013 | Iga | B60R 1/00 348/148 |
| 2013/0147945 | A1* | 6/2013 | Watanabe | H04N 7/18 348/118 |
| 2014/0043473 | A1* | 2/2014 | Gupta | G06T 7/0018 348/135 |
| 2014/0204181 | A1* | 7/2014 | Delattre | G06T 7/002 348/47 |

FOREIGN PATENT DOCUMENTS

| | | | |
|---|---|---|---|
| WO | WO 2010/038224 | 4/2010 | |
| WO | WO 2012/143036 | 10/2012 | |
| WO | WO 2012/143036 A1 * | 10/2012 | G06T 7/00 |
| WO | WO 2012/145818 | 11/2012 | |

\* cited by examiner

SYSTEM, VEHICLE AND METHOD FOR ONLINE CALIBRATION OF A CAMERA ON A VEHICLE

PRIORITY CLAIM

This application is based on and claims the priority under 35 USC 119 of European Patent Application 13186955, filed on Oct. 1, 2013, the entire disclosure of which is incorporated herein by reference.

FIELD OF THE INVENTION

The present invention relates to a system, a vehicle and a method for online or on-the-fly calibration of a camera on a vehicle.

BACKGROUND INFORMATION

A vehicle may include or have mounted thereon one or more cameras for capturing images of the environment around the vehicle. The images may be used for detecting the presence of objects, such as lanes on the road or traffic signs, or may provide the driver with a view of the immediate vicinity of the vehicle. The view of the immediate vicinity of the vehicle may be used to assist the driver when parking the vehicle or may be used to improve safety as the driver is able to view areas which are screened from him in a normal driving position. Hazards or possible hazards may also be detected from the captured image or images and then provide the driver with a warning or the information may be used in connection with driver assistance systems to actively take control of the vehicle and avoid the hazard.

Typically, several cameras, for example four, are provided on the vehicle. The images from each of the cameras may be combined to provide a 360° image in the form of a top view, also denoted as a bird's eye view, or a panoramic view. The images from adjacent cameras, for example a front camera and a side camera, may overlap with one another in order to provide an uninterrupted 360° view.

The cameras may be calibrated to determine the position and orientation of the camera relative to its surroundings. For a vehicle, the position and orientation of the camera relative to a known datum, for example the center of the front axle, may be determined in order that the images from the camera may be used to accurately combine multiple camera views into a single surround view and to accurately determine the range of an obstacle, for example.

Calibration of the cameras may be performed during manufacture of the vehicle. However, systems for calibrating the cameras automatically while the vehicle is driving have been developed to compensate for misalignment which may occur over the lifetime of the vehicle or to calibrate the position of a camera mounted on a vehicle after its manufacture. For example, DE 10 2009 057 996 A1 discloses a system for determining the position of a camera relative to the position of a vehicle. Such systems, in which a camera is calibrated while the vehicle is moving, may be denoted as online calibration systems.

SUMMARY OF THE INVENTION

In view of the above, it is an object of the present invention is to provide a method and a system for online calibration of a camera on a vehicle, which enables an accurate calibration and which can be performed using fewer processing resources. The invention further aims to avoid or overcome the disadvantages of the prior art, and to achieve additional advantages, as apparent from the present specification. The attainment of these objects is, however, not a required limitation of the claimed invention.

The above objects can be achieved according to the invention in several embodiments and aspects thereof as described herein.

A method for online calibration of a camera on a vehicle is provided. The camera has camera rotational parameters $\phi$, $\theta$, $\psi$, and camera translational parameters x, y, z, in a camera image coordinate system, and the vehicle has a vehicle coordinate system. The method comprises, while the vehicle is moving relative to the ground, calibrating the camera rotational parameters $\phi$, $\theta$, $\psi$ using a parallel geometrical calibration process or method, and calibrating at least some of the camera translational parameters and preferably the parameters $x_c$, $y_c$ independently of the camera rotational parameters $\phi$, $\theta$, $\psi$.

The camera rotational parameters are denoted by the Euler angles $\phi$, $\theta$, $\psi$ and the camera translational parameters are denoted by the Cartesian coordinate system $x_c$, $y_c$, $z_c$, where $z_c$ is the vertical height of the camera above the ground, $x_c$ denotes the longitudinal direction along the length of the car, and $y_c$ denotes the transverse direction along the width of the car. The camera rotational parameters $\phi$, $\theta$, $\psi$ and, optionally, the height $z_c$ may be determined using a parallel geometric calibration process or method such as that disclosed in WO 2012/143036 A1.

According to the invention, preferably the longitudinal and transverse translational parameters $x_c$, $y_c$ of the camera are calibrated in a step separate from the calibration of the camera rotational parameters $\phi$, $\theta$, $\psi$. This avoids data ambiguity due to attempting to solve multiple dependent variables simultaneously, which may occur if the rotational parameters and translational parameters are calibrated in a single processor method.

In an embodiment, the parallel geometric calibration processor method is used in a first step to calibrate the camera rotational parameters and the camera height $z_c$, as this method can be carried out without knowledge of the camera translational parameters $x_c$, $y_c$. The full calibration is, therefore, split into two stages by first calibrating the rotational parameters $\phi$, $\theta$, $\psi$ and the height parameter $z_c$, and separately calibrating the $x_c$, $y_c$ translational parameters in a second independent stage. Therefore, any reduction in accuracy due to solving interdependent parameters simultaneously is avoided.

The camera may be a digital or an analog video camera that captures a number of images or frames per second. Images may be captured and the data stored while the images are being displayed. Analysis of the images to identify one or more features in the images and track the trajectory of the features may be performed at the same time or at a later time after collection of a data set. Multiple data sets may also be collected to further improve the accuracy of the calibration. Data representing the actual vehicle movement, for example vehicle speed and steering angle, may be collected at the same time and associated with the images and/or data obtained from the images.

In an embodiment, the camera longitudinal and transverse translation parameters $x_c$, $y_c$, are calibrated by determining a difference in these camera translational parameters $x_c$, $y_c$ relative to the vehicle coordinate system and applying an offset to the translational parameters $x_c$, $y_c$ in the camera image coordinate system. The offset is calculated to compensate for (e.g. eliminate) the difference.

The camera translation parameters $x_c$, $y_c$ may be calibrated while the vehicle is moving along a curved path. Therefore, in one embodiment, the method includes determining that the vehicle is moving along a curved path and calibrating the camera translational parameters $x_c$, $y_c$ while the vehicle is moving along the curved path. The position of the steering wheel may be obtained from the vehicle control unit and be evaluated to determine whether the vehicle is traveling in a straight line or in a curved path. In some embodiments, the calibration of the $x_c$, $y_c$ translational parameters may occur only while the vehicle is moving in a curved path.

In an embodiment, the camera translational parameters $x_c$, $y_c$ are calibrated by determining a difference between the vehicle turning center in the camera image coordinate system and the vehicle turning center in the vehicle coordinate system.

In particular, the vehicle turning center in the camera image coordinate system may be determined by tracking two or more features in at least two images captured by the camera over a period of time, mapping the two or more features to a ground plane, fitting an arc to the mapped features and calculating the vehicle turning center in the camera image coordinate system from the arc.

The vehicle turning center in the vehicle coordinate system may be determined by measuring the vehicle steering angle and calculating the vehicle turning center in the vehicle coordinate system from the vehicle steering angle.

If a difference in position of the vehicle turning center is determined in the camera image coordinate system relative to the vehicle coordinate system or vice versa, an offset to be added to the $x_c$, $y_c$ translational parameters of the camera is determined so that the position of the vehicle turning center in the camera image coordinate system will correspond to the position of the vehicle turning center in the vehicle coordinate system. This offset is then applied to the $x_c$, $y_c$ translational parameters of the camera. In order to further improve the accuracy of the calibration, the camera translational parameters $x_c$, $y_c$ may be calibrated while the vehicle is moving in a curved path curving anticlockwise i.e. counter-clockwise, and/or while the vehicle is moving in a curved path curving clockwise, in other words when the driver is steering to the left or to the right. This can involve successive stages of calibration through a left turn curve and then through a right turn curve with successive improving precision, or can be carried out in one stage of calibration with one level of precision.

The accuracy of the calibration may also be improved by calibrating the camera translational parameters $x_c$, $y_c$ while the vehicle is moving in curved paths having differing radii, i.e. when the vehicle is moving through a gentle curve or a sharp curve to the left or to the right. This can also involve successive stages of calibration through a gentle curve and then through a tight curve with successive improving precision, or can be carried out in one stage of calibration with one level of precision.

The parallel geometrical calibration process or method used for calibrating the camera rotational parameters is, typically, only carried out if the vehicle is traveling in a straight line. Therefore, in a further embodiment, the method includes determining that the vehicle is traveling in a straight line and calibrating the camera rotational parameters $\phi$, $\theta$, $\psi$ using the parallel geometrical method. The steering wheel angle may be used to determine that the vehicle is traveling in a straight line, for example. Various methods based on the parallel geometrical principle may be used to determine the camera rotational parameters and, optionally, also the height $z_c$ of the camera.

In an embodiment, the parallel geometrical calibration process or method comprises, while the vehicle is traveling in a straight line, tracking two or more longitudinal features from at least two images captured by the camera over a period of time and adjusting the camera rotations such that the recorded trajectories of the features are parallel when mapped from the camera image coordinate system to the vehicle coordinate system.

If the height $z_c$ of the camera is to be determined, this may be performed by recording the speed of the vehicle while tracking the longitudinal features and determining the distance that a feature has moved in the camera image in a predetermined period of time.

The height $z_c$ of the camera may be calibrated by determining a difference between the distance measured from the camera image and a predicted distance calculated from the vehicle speed, calculating an offset in the height of the camera from the difference, and adding the offset to a stored value of the camera height.

Another embodiment of the invention provides a computer program product that comprises machine-readable program code tangibly embodied thereon, e.g. stored or recorded or encoded in a tangible physical medium such as a magnetic tape, a magnetic disc, an optical disc, an electronic memory or any other known device, product or tangible medium for recording, storing or encoding data or code thereon. The program code, when executed on a processor, causes the processor and/or connected peripheral devices to perform the method of at least one of the embodiments described herein.

The computer program product may comprise a data carrier, such as an optical drive, hard disk, flash memory etc. This embodiment may be useful if the computer program is to upgrade or enhance an existing system.

The computer program may alternatively be stored in memory in a device or a system for image capturing and/or image processing. This embodiment may be used if a device and system is provided for installation in a vehicle.

A further embodiment provides a system that comprises a calibration unit comprising a first input configured and adapted to receive images from at least one camera, a memory configured and adapted to store camera translational parameters $x_c$, $y_c$, $z_c$ and camera rotational parameters $\phi$, $\theta$, $\psi$, a second input configured and adapted to receive an actual (e.g measured or sensed) vehicle steering angle, a third input configured and adapted to receive an actual (e.g measured or sensed) vehicle speed and processing arrangement including at least one computer processor configured and adapted to perform the method of one of the embodiments described herein. The processing arrangement may include a memory including tangible code that when executed by the processing arrangement, causes the processing arrangement to perform the method of one of the embodiments described herein.

The system may further comprise at least one camera and a display for displaying images from the camera, as well as sensors for sensing the vehicle steering angle, the vehicle speed, and other pertinent parameters of the vehicle and/or its motion.

Typically several cameras, for example four, are provided on the vehicle. The images from each of the cameras may be combined to provide a 360° image in the form of a top view, also denoted as a bird's eye view, or a panoramic view. Typically, the images from adjacent cameras, for example a front camera and a side camera, overlap with one another in order to provide an uninterrupted 360° view. The images from two or more cameras may be combined using additional methods carried out by a processing unit. Calibration of the cameras using one of the methods described herein may be used to remove or reduce differences in the position of features within the images captured by different cameras to provide a "seamless" combined image.

Another embodiment provides a vehicle that includes at least one camera mounted on the vehicle and the system of one of the embodiments described herein.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1A:
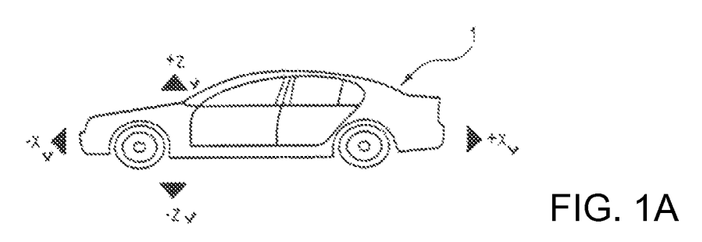
FIGS. 1A and 1B illustrate schematic side and top views of a vehicle and a vehicle coordinate system.
Figure 1B:
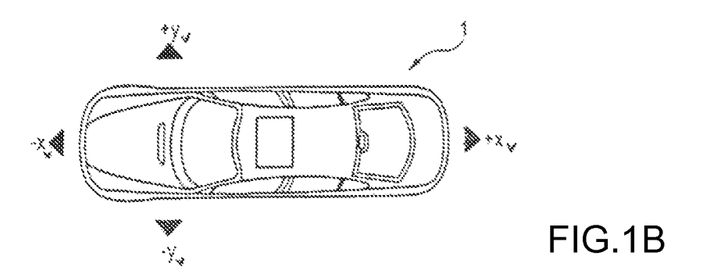

FIG. 1 including FIGS. 1A and 1B illustrates schematic side and top views of a vehicle 1 and a vehicle coordinate system $x_v$, $y_v$, $z_v$. The vehicle coordinate system is a Cartesian coordinate system with a datum which, in this embodiment, is taken as the center of the front axle. In the vehicle coordinate system, the direction $x_v$ extends in the direction of the length of the vehicle, the direction $y_v$ in the direction of the width of the vehicle and the direction $z_v$ in the direction of the height of the vehicle. Due to the datum being positioned in the center of the front axle, $-y_v$ extends to the left of the vehicle, $+y_v$ extends to the right of the vehicle, $-x_v$ is forward of the front axle, $+x_v$ is rearward of the front axle, $+z_v$ is above the front axle and $-z_v$ is below the front axle. Opposite orientations of one or more of the directions are possible in other examples, e.g. if the vehicle in FIG. 1 is reversed or flipped lengthwise so it faces with its front end to the right, whereby $+x_v$ would be forward of the front axle.

Figure 2:
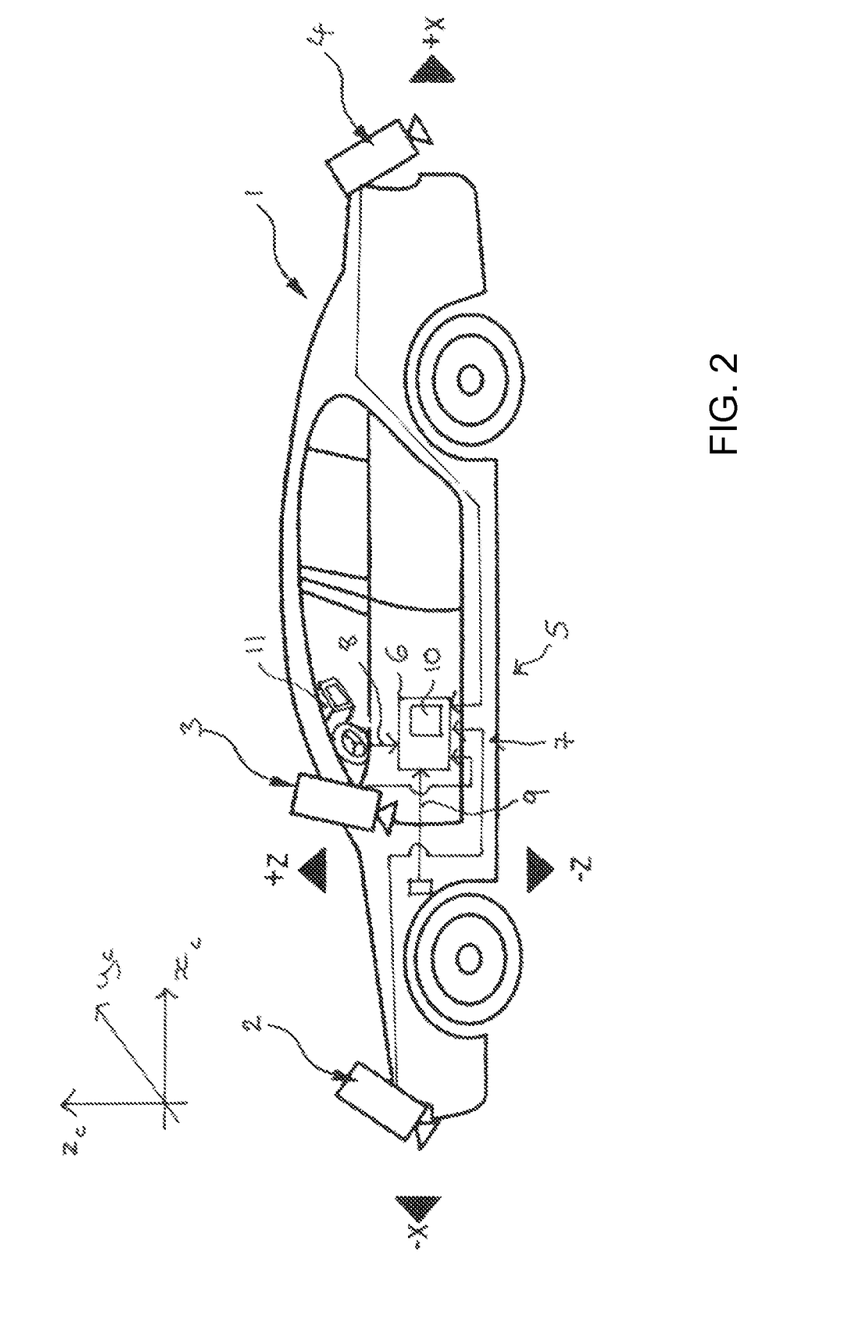
FIG. 2 illustrates a schematic side view of a vehicle including cameras and a system for calibrating the cameras.

FIG. 2 illustrates a schematic side view of a vehicle 1 including four cameras of which three 2, 3, 4 are illustrated or visible in this view of the vehicle 1. Camera 2 is positioned to capture the environment forward of the vehicle, camera 3 is positioned to capture the environment facing the left side of the vehicle, camera 4 is positioned to capture the environment rearward of the vehicle and a non-illustrated camera is positioned on the right-hand side of the vehicle to capture the environment to the right of the vehicle 1.

The cameras have a wide field of view so that a complete 360° image can be captured of the immediate vicinity of the vehicle 1. However, the methods described herein, may be used for cameras having a smaller field of view, and/or may be used for a vehicle including only a single camera or more or fewer than four cameras.

A camera has intrinsic parameters and extrinsic parameters. The camera extrinsic parameters describe a camera image coordinate system which includes three rotational parameters $\phi$, $\theta$, $\psi$ and three translational parameters $x_c$, $y_c$, $z_c$. The three translational parameters $x_c$, $y_c$, $z_c$ are illustrated in FIG. 2.

It is desirable that these parameters of the camera image coordinate system correspond to those of the real world, for example, to those of the vehicle coordinate system so that the positions of features captured in images by the camera (and respectively by all of the plural cameras) can be accurately mapped to their positions in the real world (and preferably in the vehicle coordinate system). This mapping may be used for detecting objects in the vicinity of the vehicle, for example hazards. This information may be used to warn the driver of the vehicle or may be used by driver assistance systems so that the vehicle driver assistance system automatically takes appropriate action to avoid the hazard.

The rotational parameters $\phi$, $\theta$, $\psi$ and translational parameters $x_c$, $y_c$, $z_c$ of the camera extrinsics may be calibrated when the camera is mounted on the vehicle in the factory. However, the camera extrinsics may vary over time, for example because the position of the camera on the vehicle slightly changes, or a camera may require calibrating as it has been fitted to the vehicle after its production. One way of calibrating the camera is to calibrate the camera while the camera is moving and, since it is mounted on the vehicle, while the vehicle is moving, using an online or on-the-fly calibration method.

The vehicle 1 includes a system 5 including a calibration unit 6 having a first input 7 coupled to the cameras so that it is able to receive images from these cameras and a display 11 for displaying images from the cameras. The calibration unit 6 further includes a second input 8 for receiving the actual (e.g measured or sensed) vehicle steering angle and a third input 9 for receiving the actual (e.g. measured or sensed) vehicle speed. The vehicle steering angle data and vehicle speed data may be provided in any known manner, e.g. from sensors or systems typically already present in a conventional vehicle, or by additional sensors provided to sense these data values. The calibration unit 6 further includes a processing arrangement 10 for the online calibration of at least one of the cameras 2, 3, 4 mounted on the vehicle 1.

Figure 3:
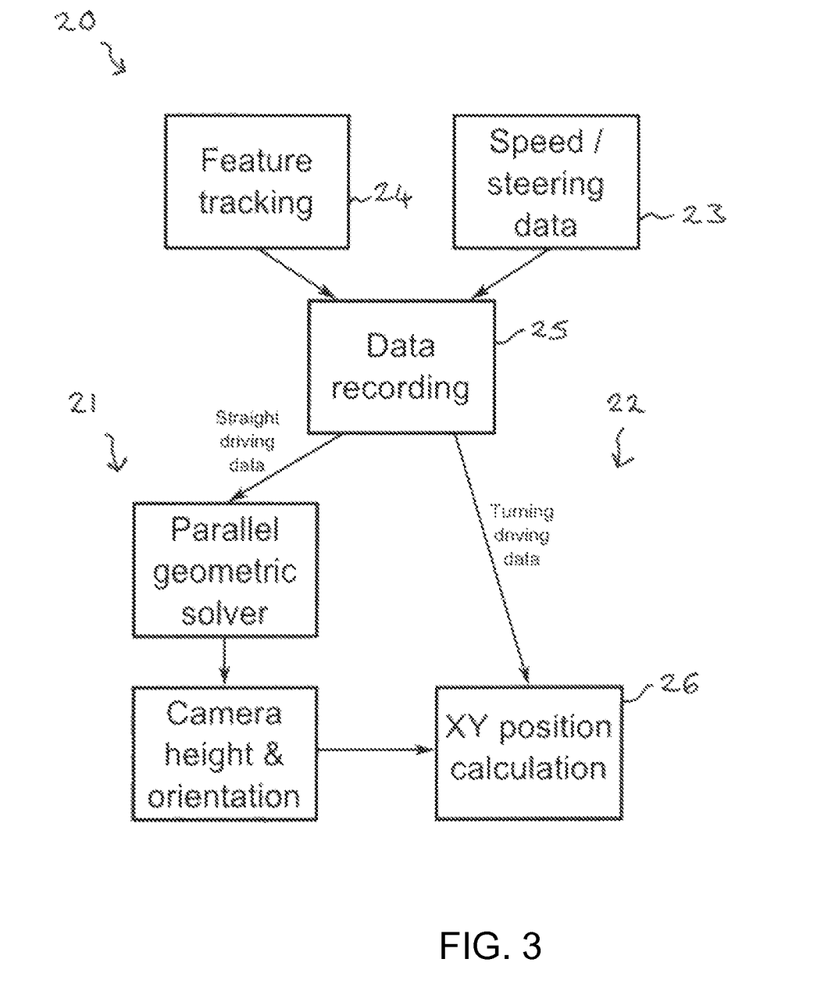
FIG. 3 illustrates a schematic block diagram of a method for online calibration of a camera on a vehicle.

FIG. 3 illustrates a schematic block diagram for explaining a method 20 for online calibration of a camera on a vehicle, such as one of the cameras 2, 3, 4 mounted on the vehicle 1 illustrated in FIG. 2, according to a first embodiment.

While the vehicle is moving relative to the ground, the camera rotational parameters $\phi$, $\theta$, $\psi$ are calibrated using a parallel geometrical calibration method 21, such as the parallel geometrical calibration method disclosed in WO 2012/143036 A1, in a first step. The camera longitudinal and transverse translational parameters $x_c$, $y_c$ are calibrated in a second step 22, independently of the camera rotational parameters $\phi$, $\theta$, $\psi$ and independently of the method 21 for calibrating the camera rotational parameters.

The parallel geometrical calibration method 21 may be carried out first and the second step 22 is carried out afterwards. Therefore, after the rotational parameters $\phi$, $\theta$, $\psi$ of the camera are calibrated, a further calibration is carried out to calibrate the camera translational parameters $x_c$, $y_c$. However, alternatively the two calibrating processes may be carried out in the opposite order, or simultaneously with one another, or partially overlapping with one another in either order.

In the calibration method 22, the camera longitudinal and transverse translational parameters $x_c$, $y_c$ are calibrated by determining a difference between the camera translational parameters relative to the vehicle coordinate system and, therefore, relative to the real world. If a difference is determined, an offset is applied to the translational parameters $x_c$, $y_c$ in the camera image coordinate system to compensate for (e.g. zero-out) the difference.

At least some of the camera translational parameters $x_c$, $y_c$ (and optionally $z_c$) are calibrated while the vehicle is moving along a curved path. Consequently, the second step 22 includes receiving data 23 from the vehicle, for example from a vehicle control unit, about the vehicle speed and steering wheel angle, in order to determine that the vehicle is moving relative to the ground and in a curved path. Images are received from the camera in step 24 and the images and data from the vehicle are recorded in step 25. In step 26, at least two features within the first image are identified. A subsequent image collected by the same camera is further analyzed to determine the position of the at least two features therein, and the position of these features is tracked over two or more successive images captured by the camera over a period of time. In this specification, the word "successive" is not limited to "directly successive" or "directly consecutive", and thus also encompasses a sequence of two images that occur one after another but can have one or more other images occurring therebetween. This data (e.g. the results of the analysis of the moving positions of the tracked features in the successive images) is used to identify the vehicle turning center $T_c$ in the camera image coordinate system and the vehicle turning center $T_v$ in the vehicle coordinate system.

Figure 4:
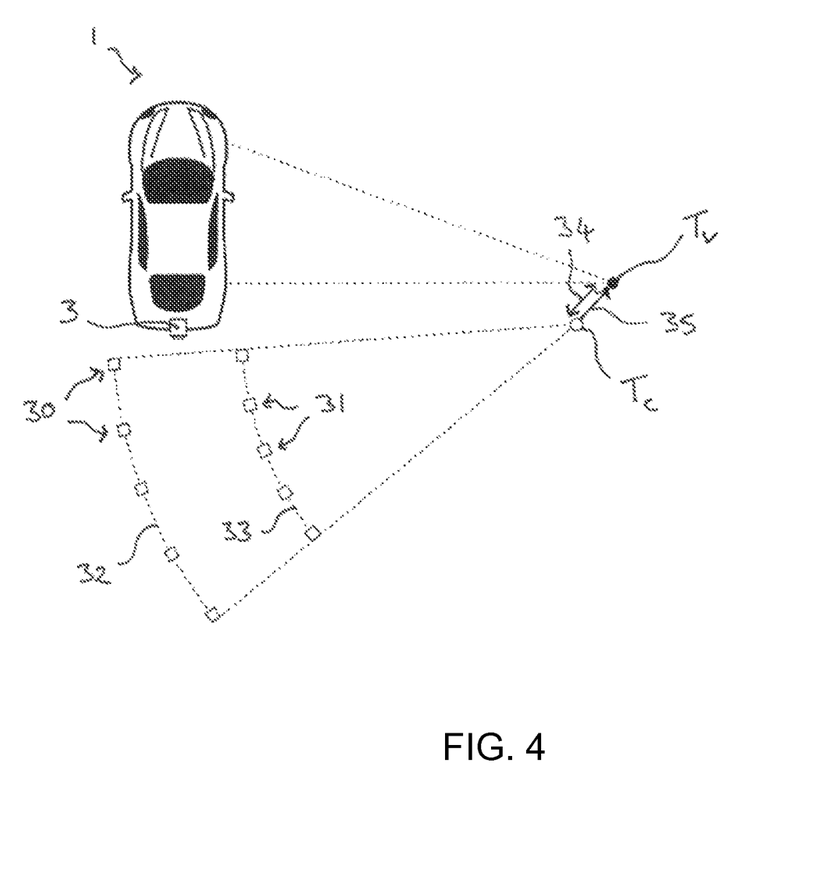
FIG. 4 illustrates a schematic diagram for explaining a method or process for calibrating camera translational parameters.

FIG. 4 illustrates a schematic diagram of a method for determining the vehicle turning center $T_c$ in the camera image coordinate system and the vehicle turning center $T_v$ in the vehicle coordinate system. A vehicle 1 with a rear camera 3 is illustrated, in a scenario in which the vehicle 1 has moved along a curved path. In the illustrated example, the position of two features 30, 31 relative to the ground for five images is determined, a respective arc 32, 33 is fitted to each of the trajectories formed by the successive images of the two features 30, 31 and the turning center $T_c$ of the vehicle in the camera coordinate system is calculated from these arcs 32, 33.

The actual (e.g. sensed or measured) data from the vehicle regarding the steering wheel angle is used to calculate the vehicle turning center $T_v$ in the vehicle coordinate system. The respective positions of the vehicle turning center $T_c$ in the camera image coordinate system and the vehicle turning center $T_v$ in the vehicle coordinate system are compared and, if there is a difference 34 between them, then this difference is used to calculate an offset 35 which is applied (e.g. added) to the $x_c$, $y_c$ parameters of the camera in order to shift the coordinates of $T_c$ (plus the offset) to match the coordinates of $T_v$, thus calibrating the $x_c$, $y_c$ translational parameters of the camera.

Returning to FIG. 3, in the parallel geometrical method 21 used to calibrate the camera rotational parameters $\phi$, $\theta$, $\psi$, data from the cameras is collected in step 24 and data from the vehicle is collected while the vehicle is traveling in a straight line in step 25. Thus, step 25 can be regarded as separate for the two independent calibration processes, or can be regarded as a combined or composite or omnibus data gathering and recording step, which may be performed using a single memory or separate memories for the two independent calibration processes.

If the vehicle is moving relative to the ground and in a straight line, the online calibration of the camera rotational parameters may be performed by tracking two or more longitudinal features in at least two successive images captured by the camera over a period of time. The parallel geometrical calibration method disclosed in WO 2012/143036 A1 may be used, for example.

The camera rotational parameters $\phi$, $\theta$, $\psi$ are adjusted (e.g. shifted or supplemented with an offset as necessary) so that the recorded trajectories of the longitudinal features are parallel when mapped from the camera image coordinate system to the vehicle coordinate system. This is illustrated schematically in FIG. 5.

Figure 5:
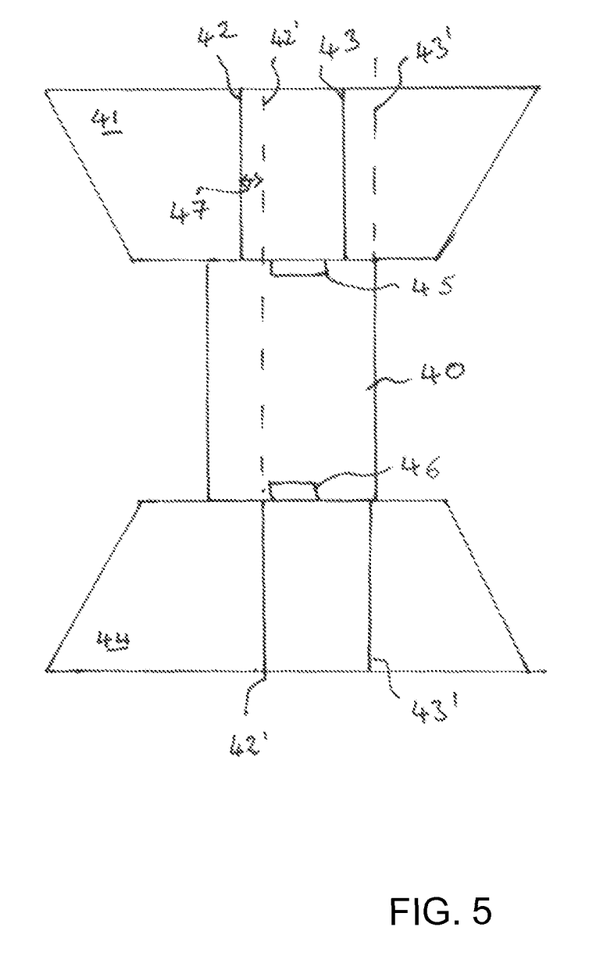
FIG. 5 illustrates a schematic diagram for explaining a method or process for calibrating camera rotational parameters.

FIG. 5 illustrates a schematic view of images captured by two cameras mounted on a vehicle 40. In the image 41 captured by the front camera 45, two longitudinal features 42, 43, for example a lane marking on the road, are indicated. In the image 44 captured by the rear camera 46, the same two longitudinal features 42', 43' are captured. It can be seen that there is a difference 47 between the position of the longitudinal features 42, 43 captured in the image 41 and the same longitudinal features 42', 43' captured in the image 44. Because the two cameras 45, 46 captured the same longitudinal features (based on an image analysis of the images of the two cameras), the positions of these longitudinal features should be the same in both images 41, 44. Therefore, the difference 47 is used to determine a contrary offset to adjust the camera rotational parameters (e.g. to add to the rotational parameters of the camera 46) so that the positions of the longitudinal features 42, 43 is respectively the same in both images 41, 44.

The height $z_c$ of the camera may also be determined using the parallel geometrical calibration method by recording the speed of the vehicle while tracking the longitudinal features. This enables the distance that a feature has moved in the camera image in a predetermined period of time to be determined. Using triangulation, the height $z_c$ of the camera is determined.

The height $z_c$ of the camera may also be calibrated by determining any existing difference between the distance measured from the camera image and a predicted distance calculated from the vehicle speed. If a difference is determined, this is used to calculate an offset which is added to a stored value of camera height.

To summarize, the camera longitudinal and transverse translational parameters $x_c$, $y_c$ are calibrated in a method step separate from a calibration of the camera rotational parameters $\phi$, $\theta$, $\psi$ in order to avoid data ambiguity due to attempting to solve multiple dependent variables simultaneously, which may occur if the rotational parameters and translational parameters are calibrated in a single process or method. Any prior art parallel geometrical calibration process or method, such as the method disclosed in WO 2012/143036 A1, may be used to calibrate the camera rotational parameters $\phi$, $\theta$, $\psi$ and, optionally also the camera height $z_c$.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A method for calibration of a camera on a vehicle driving on a ground in an environment, wherein camera rotational parameters and camera translational parameters are defined in a camera image coordinate system for the camera, wherein a vehicle coordinate system is defined for the vehicle, and wherein the method comprises steps:
   while moving the vehicle relative to the ground, calibrating the camera rotational parameters using a parallel geometrical calibration process,
   determining that the vehicle is moving along a curved path, and
   while the vehicle is moving along the curved path, calibrating at least selected ones of the camera translational parameters independently of the camera rotational parameters, wherein the calibrating of the selected camera translational parameters comprises the calibrating steps:
   tracking at least two features of the environment in at least two successive images captured by the camera over a period of time,
   mapping the at least two features to a ground plane,
   fitting an arc to the at least two features mapped to the ground plane,
   calculating a first vehicle turning center in the camera image coordinate system from the arc,
   determining a vehicle steering angle,
   calculating a second vehicle turning center in the vehicle coordinate system from the vehicle steering angle,
   determining a difference between the first vehicle turning center in the camera image coordinate system and the second vehicle turning center in the vehicle coordinate system,
   determining, from the difference, an offset to be applied to the selected camera translational parameters so that a position of the first vehicle turning center in the camera image coordinate system will correspond to the position of the second vehicle turning center in the vehicle coordinate system, and
   applying the offset to the selected camera translational parameters.

2. The method according to claim 1, wherein the camera rotational parameters include three parameters $\phi$, $\theta$ and $\psi$ respectively relating to rotational orientations about three orthogonal axes, wherein the camera translational parameters include a longitudinal translational parameter $x_c$, a transverse translational parameter $y_c$, and a height parameter $z_c$, and wherein the step of calibrating at least selected ones of the camera translational parameters comprises calibrating the longitudinal translational parameter $x_c$ and the transverse translational parameter $y_c$.

3. The method according to claim 2, further comprising:
   while the vehicle is traveling in a straight line, tracking at least two longitudinal features of the environment in at least two successive images captured by the camera over a predetermined period of time to provide two recorded trajectories, and
   calibrating the height parameter $z_c$ by determining a camera height of the camera by recording a vehicle speed of the vehicle while tracking the longitudinal features, and determining a first distance that a respective one of the features has moved in the successive images in the predetermined period of time.

4. The method according to claim 3, wherein the calibrating of the height parameter $z_c$ further comprises determining a difference between the first distance and a predicted distance calculated from the vehicle speed, calculating an offset in the camera height from the difference, and adding the offset to a stored value of the camera height.

5. The method according to claim 1, comprising performing the calibrating of the selected camera translational parameters after performing the calibrating of the camera rotational parameters.

6. The method according to claim 1, wherein the calibrating of the selected camera translational parameters is performed only while the vehicle is moving along the curved path.

7. The method according to claim 1, wherein the selected camera translational parameters are calibrated by repeating the calibrating respectively while the vehicle is moving in respective curved paths curving counter-clockwise and curving clockwise.

8. The method according to claim 1, wherein the selected camera translational parameters are calibrated by repeating the calibrating respectively while the vehicle is moving in respective curved paths having differing radii.

9. The method according to claim 1, further comprising, at a different time than the moving along the curved path, determining that the vehicle is traveling in a straight line, and performing the calibrating of the camera rotational parameters using the parallel geometrical calibration process while the vehicle is traveling in the straight line.

10. The method according to claim 9, wherein the parallel geometrical calibration process comprises:
   while the vehicle is traveling in the straight line tracking at least two longitudinal features of the environment in at least two successive images captured by the camera over a period of time to provide two recorded trajectories, and
   adjusting the camera rotational parameters such that the two recorded trajectories are parallel to one another or respectively aligned with one another when mapped from the camera image coordinate system to the vehicle coordinate system.

11. A system for a vehicle, for performing the method according to claim 1, comprising a calibration unit that comprises:
   a first input configured and adapted to receive images from the camera on the vehicle,
   a memory configured and adapted to store the camera translational parameters and the camera rotational parameters,
   a second input configured and adapted to receive an actual vehicle steering angle,
   a third input configured and adapted to receive an actual vehicle speed, and
   a processing arrangement configured and adapted to perform the method for the online calibration of the camera.

12. The system according to claim 11, further comprising the camera and a display configured and adapted to display images from the camera.

13. A non-transitory computer-readable medium storing a computer program embodied thereon, that when executed on a processor, causes the processor to perform the method according to claim 1.

14. A method of calibrating a camera on a vehicle, wherein a vehicle coordinate system is defined relative to the vehicle, wherein a longitudinal translational parameter, a transverse translational parameter and rotational parameters are defined in a camera image coordinate system for the camera, and the method comprises steps:

a) while the vehicle is moving, obtaining first image data from the camera;
b) evaluating the first image data and performing a parallel geometrical calibration process based thereon, to thereby calibrate the rotational parameters of the camera to the vehicle coordinate system;
c) while the vehicle is moving along a curved path, obtaining second image data from the camera; and
d) evaluating the second image data and performing a separate calibration process based thereon, to thereby calibrate the longitudinal translational parameter and the transverse translational parameter of the camera to the vehicle coordinate system, wherein the separate calibration process is performed separately and independently of the parallel geometrical calibration process and separately and independently of the rotational parameters, and wherein the separate calibration process for calibrating the longitudinal and transverse translational parameters comprises the calibrating steps:
  tracking at least two environment features in at least two successive images of the second image data,
  mapping the at least two environment features to a ground plane,
  fitting an arc to the at least two environment features mapped to the ground plane,
  calculating a first turning center of the vehicle in the camera image coordinate system from the arc,
  determining a steering angle of the vehicle,
  calculating a second turning center of the vehicle in the vehicle coordinate system from the steering angle,
  determining a difference between the first turning center in the camera image coordinate system and the second turning center in the vehicle coordinate system,
  determining, from the difference, an offset to be applied to the longitudinal and transverse translational parameters so that a position of the first turning center in the camera image coordinate system will correspond to the position of the second turning center in the vehicle coordinate system, and
  applying the offset to the longitudinal and transverse translational parameters.

\* \* \* \* \*